(No Model.)

J. A. MALONEY & F. BURGER.
ELECTROPHORE OR SECONDARY BATTERY.

No. 247,935. Patented Oct. 4, 1881.

Witnesses:
D. C. Fowler,
H. B. Applewhaite.

Inventors:
James A. Maloney
Franz Burger
per Atty J. A. Maloney

UNITED STATES PATENT OFFICE.

JAMES A. MALONEY AND FRANZ BÜRGER, OF WASHINGTON, D. C., ASSIGNORS, BY DIRECT AND MESNE ASSIGNMENTS, TO THE AMERICAN ELECTROPHORE COMPANY, OF SAME PLACE.

ELECTROPHORE OR SECONDARY BATTERY.

SPECIFICATION forming part of Letters Patent No. 247,935, dated October 4, 1881.

Application filed July 20, 1881. (No model.)

*To all whom it may concern:*

Be it known that we, JAMES A. MALONEY and FRANZ BÜRGER, of Washington, District of Columbia, have invented certain Improvements in Electrophores or Secondary Batteries; and we hereby declare the following to be a full, clear, and exact description thereof, reference being had to the accompanying drawings, making part of this specification, in which—

Figure 1:
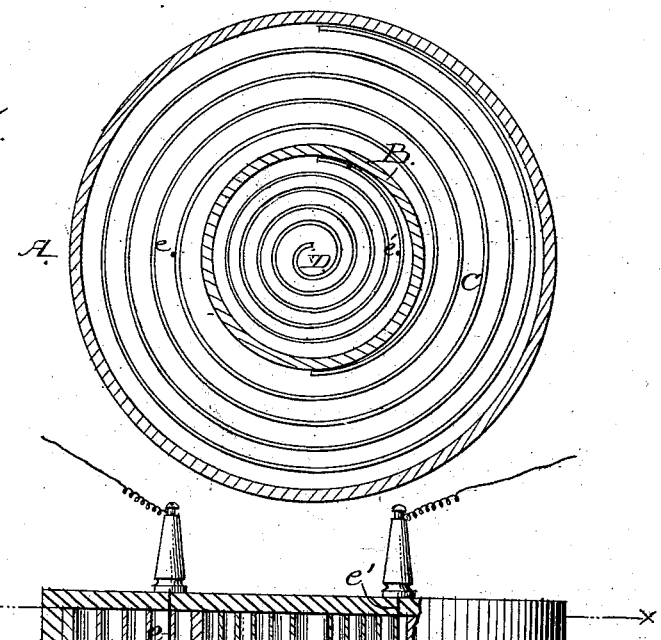
Figure 2:
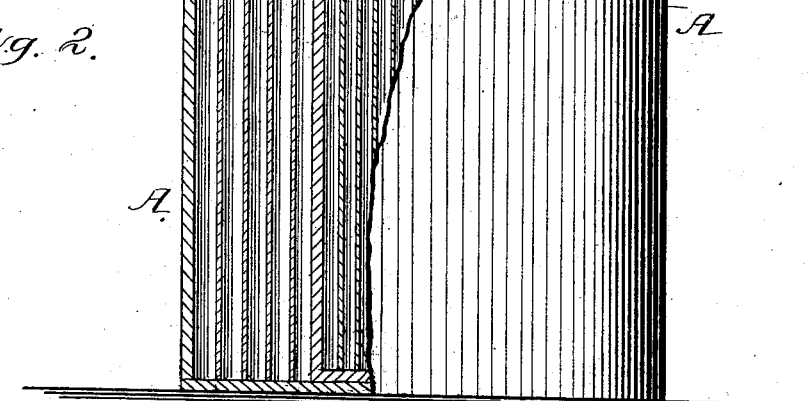

Figure 1 is a horizontal section through the electrophore or secondary battery. Fig. 2 is a vertical section of the same with cap attached.

The object of our invention is to produce cheaply and quickly a cell for storing electricity in a similar manner as described in our application of June 13, 1881.

Our invention consists in a non-conducting vessel provided with a central porous cup combined with a metal coil around the outside of the porous cup and a metal coil within the porous cup, each coil being coated with red lead and provided with an electrode, and the whole vessel being filled with acidulated water.

In order that those skilled in the art may make and use our invention, we will proceed to describe the manner in which we have carried it out.

In the said drawings, A is a non-conducting jar or vessel, in the center of which is placed a porous cup, B. Around the porous cup is arranged a coiled metallic sheet, C, coated with red lead and provided with a projecting electrode, *e*, and within the porous cup is another coiled-metal sheet D, coated with red lead and provided with an electrode, *e'*. The vessel A and the porous cup B are then filled with dilute sulphuric acid. The sheets preferably used are of lead, and when connections are made with a battery through means of binding-posts and the cell placed in circuit the action takes place, as described in our pending application filed June 13, 1881, and after the surfaces of the plates change the electricity becomes stored.

The interposition of the porous cup not only affords a ready means for separating the two metal plates, but also obviates any contacts being made at the lower ends or edges of the sheets by the dropping down of a small quantity of the red lead; besides there is more surface exposed in proportion to the size of the plates, as no insulating medium has to be used.

We have described the improved electrophore or secondary battery provided with two plates of lead; but we do not confine ourselves to lead, as any two plates of the same metal that would produce the same effect in the same way would in use not depart from the spirit of our invention.

We do not claim, broadly, herein the use of red lead, as that forms a part of our application filed June 13, 1881.

Having thus described our invention, what we claim as new, and desire to secure by Letters Patent, is—

An electrophore or secondary battery substantially as described, consisting of an exterior non-conducting vessel containing a central porous cup, two coils of the same metal coated with red lead, one arranged within the porous cup and one without the porous cup, both vessel and porous cup being filled with acidulated water, for the purpose specified.

JAMES A. MALONEY.
FRANZ BÜRGER.

Witnesses:
J. W. HAMILTON JOHNSON,
EDMOND BRODHAG.